April 13, 1926.
E. JASHEWAY ET AL
PNEUMATIC BUMPER
Filed July 22, 1925
1,580,203
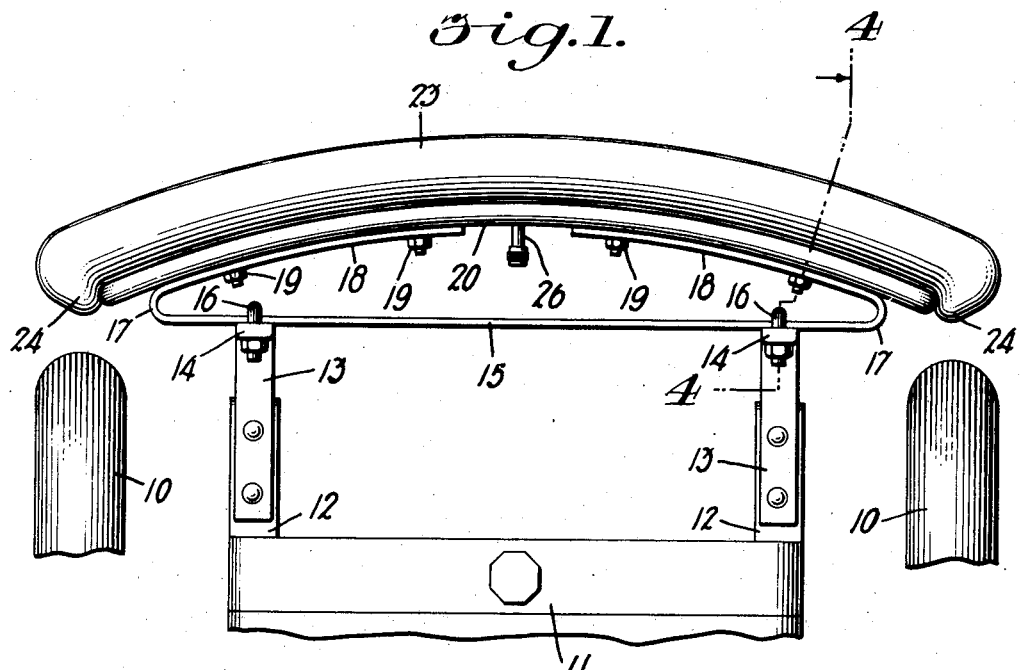
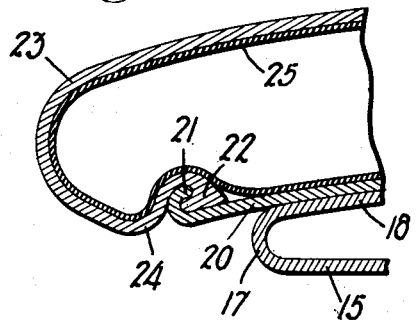
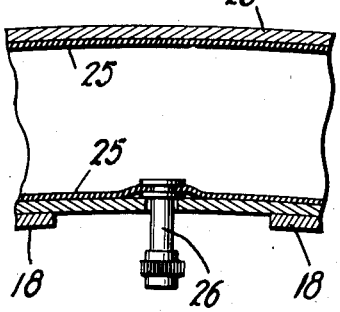
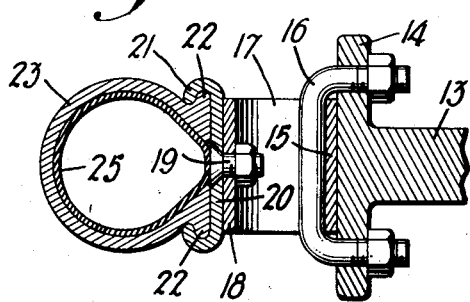
INVENTORS
Everett Jasheway
and Henry Duemler
BY
ATTORNEY Patented Apr. 13, 1926.

1,580,203

UNITED STATES PATENT OFFICE.

EVERETT JASHEWAY AND HENRY DUEMLER, OF VAILS MILL, NEW YORK.

PNEUMATIC BUMPER.

Application filed July 22, 1925. Serial No. 45,169.

*To all whom it may concern:*

Be it known that we, EVERETT JASHEWAY and HENRY DUEMLER, citizens of the United States, residing at Vails Mill, in the county of Fulton and State of New York, have invented certain new and useful Improvements in Pneumatic Bumpers, of which the following is a specification.

This invention relates to vehicle fenders or bumpers as applied to the front and rear thereof and has as one of its objects to provide not only an effective fender but one presenting a highly elastic cushion to receive the impact of objects against which the vehicle may strike.

It is a further feature to produce a bumper having an inflatable pneumatic element encased in a resilient shoe by which the shock of contact is minimized, both to the vehicle and to the object with which it may make contact.

Another aim is in the provision of a bumper that may be readily and securely attached in operative position to any ordinary type of vehicle without changes being made in the same.

These and other like objects are attained by the novel construction, combination and arrangement of parts hereinafter described and shown in the accompanying drawing, forming a material part of this disclosure, and in which:—

Figure 1 is a top plan view of an embodiment of the invention, showing its application to a conventionel type of vehicle.

Figure 2 is an enlarged fragmentary longitudinal sectional view at the end thereof.

Figure 3 is a similar view of the middle of the bumper.

Figure 4 is a transverse sectional view taken on line 4—4 of Figure 1.

In the drawing, the numeral 10 designates the front wheels of a vehicle, represented generally by the numeral 11, below which the chassis frame 12 extends to the front.

Securely attached to the frame 12, are bars 13 having forwardly reaching T shaped heads 14 disposed in a vertical plane, against which is seated a flat bar 15 held rigidly by clevis bolts 16 provided with nuts to clamp the bar against the heads.

The ends of the bar 15 are curved, as at 17, to present bowed portions 18 directly in front of the bar 15, and held by bolts 19 in a correspondingly curved clincher plate 20 having re-entrantly turned edges 21 at its sides and ends.

Held in these enclosing clincher edges are the correspondingly shaped edges 22 of a rubber shoe 23 of substantially circular cross section, made in a manner similar in all respects to an ordinary wheel tire, to present a curve having bulged ends 24 which extend over the ends of the clincher plate 20, as shown in Figures 1 and 2.

A pneumatic tube 25 is shaped to be received within the shoe 23, to completely fill the interior space therein, and at the center of its length, at the rear or inner side, is provided with an air filling valve 26 of any preferred type, the end of the valve extending towards the bar 15 between the ends of the elements 18, in position to be filled with air from any convenient source.

It will be apparent that a cushioned bumper has been disclosed which may be filled with air, in the same manner as a tire, to any desired extent and obviously is far lighter in weight than the usual metal attachment for similar purposes.

It is to be noted that the ends of the bumper extend past the faces of the wheels, thus affording adequate protection to the entire vehicle, while the shape is such as to have a glancing effect upon an object struck.

Having thus described our invention and set forth the manner of its construction, application and use, what we claim as new and desire to secure by Letters Patent, is:—

1. A vehicle bumper comprising a bar having extending in-bowed ends, a metallic clincher plate bolted to said ends, means for attaching said bar to a vehicle, a rubber shoe engaged by said clincher plate, an inflatable tube filling said shoe and means for entering air to said tube.

2. A vehicle bumper comprising a bar, means for detachably engaging the bar to the chassis frame of a vehicle, curved, in-reaching arms formed on said bar to extend in front thereof, a curved clincher plate bolted to said arms, inturned clincher elements circumambiently formed on said plate, a rubber shoe engaged at its edges in said clincher elements, an inflatable tube disposed in said shoe, and an air inlet valve for said tube.

3. A vehicle bumper comprising a bar, means for detachably engaging the bar to the chassis frame of a vehicle, curved, in-reaching arms formed on said bar to extend in front thereof, a curved clincher plate bolted to said arms, inturned clincher elements circumambiently formed on said plate, a rubber shoe engaged at its edges in said clincher elements, said shoe extending past the ends of the plate, a pneumatic tube in said shoe, and means for filling said tube with air.

In witness whereof we have signed our names.

EVERETT JASHEWAY.
HENRY DUEMLER.